(12) United States Patent
Lin et al.

(10) Patent No.: US 11,664,528 B2
(45) Date of Patent: May 30, 2023

(54) ELECTRODE ELECTROCHEMICAL DEVICE AND ELECTRONIC DEVICE

(71) Applicant: Ningde Amperex Technology Limited, Fujian (CN)

(72) Inventors: Chaowang Lin, Fujian (CN); Fan Yang, Fujian (CN); Yisong Su, Fujian (CN); Huawei Zhong, Fujian (CN); Changming Qu, Fujian (CN); Xiaozhen Zhang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 17/707,378

(22) Filed: Mar. 29, 2022

(65) Prior Publication Data

US 2022/0223903 A1 Jul. 14, 2022

Related U.S. Application Data

(60) Continuation of application No. 16/868,966, filed on May 7, 2020, now Pat. No. 11,322,774, which is a
(Continued)

(30) Foreign Application Priority Data

Feb. 26, 2018 (CN) .......................... 201810162494.1

(51) Int. Cl.
*H01M 4/02* (2006.01)
*H01M 10/0525* (2010.01)
(Continued)

(52) U.S. Cl.
CPC ....... *H01M 10/0525* (2013.01); *H01M 4/366* (2013.01); *H01M 4/382* (2013.01);
(Continued)

(58) Field of Classification Search
CPC ....................................................... H01M 4/02
See application file for complete search history.

(56) References Cited

U.S. PATENT DOCUMENTS

| 2002/0028380 A1 | 3/2002 | Tanjo et al. |
| 2007/0026316 A1 | 2/2007 | Imachi et al. |

(Continued)

FOREIGN PATENT DOCUMENTS

| CN | 1658413 A | 8/2005 |
| CN | 201153140 Y | 11/2008 |

(Continued)

OTHER PUBLICATIONS

Office Action dated Jan. 27, 2022, in connection with corresponding Chinese Application No. 202110531428. (13 pp., including machine-generated English translation).
(Continued)

*Primary Examiner* — Jacob B Marks
(74) *Attorney, Agent, or Firm* — Maier & Maier, PLLC

(57) ABSTRACT

An electrode includes a current collector; a first active material layer including a first active material; and a second active material layer including a second active material; wherein the first active material layer is arranged between the current collector and the second active material layer. The first active material layer is formed on a surface of the current collector, and a particle size of 90% accumulative volume of the first active material is less than 40 μm. The active material layer is used in the present application to ensure that the electrochemical device and the electronic device do not generate a short circuit when pressed by an external force, thereby ensuring the mechanical safety performance of the electrochemical device and the electronic device.

20 Claims, 1 Drawing Sheet

Related U.S. Application Data division of application No. 16/000,597, filed on Jun. 5, 2018, now Pat. No. 10,693,181.

(51) Int. Cl.

| | |
|---|---|
| *H01M 4/36* | (2006.01) |
| *H01M 4/38* | (2006.01) |
| *H01M 4/50* | (2010.01) |
| *H01M 4/52* | (2010.01) |
| *H01M 4/583* | (2010.01) |
| *H01M 4/62* | (2006.01) |
| *H01M 4/66* | (2006.01) |

(52) U.S. Cl.
CPC .............. *H01M 4/50* (2013.01); *H01M 4/52* (2013.01); *H01M 4/583* (2013.01); *H01M 4/623* (2013.01); *H01M 4/661* (2013.01); *H01M 2004/027* (2013.01); *H01M 2004/028* (2013.01)

(56) References Cited

U.S. PATENT DOCUMENTS

| | | | |
|---|---|---|---|
| 2014/0295284 A1 | 10/2014 | Ijiri et al. | |
| 2016/0013480 A1* | 1/2016 | Sikha | H01M 4/043 427/126.6 |

FOREIGN PATENT DOCUMENTS

| | | |
|---|---|---|
| CN | 102306777 A | 1/2012 |
| CN | 103187576 A | 7/2013 |
| CN | 103258999 A | 8/2013 |
| CN | 104347842 A | 2/2015 |
| CN | 103187576 B | 7/2015 |
| CN | 105070882 A | 11/2015 |
| CN | 105074967 A | 11/2015 |
| CN | 105304859 A | 2/2016 |
| CN | 107293688 A | 10/2017 |

OTHER PUBLICATIONS

Office Action dated Aug. 29, 2019, in connection with corresponding Chinese Application No. 201810162494.1; (14 pp., including machine-generated English translation).

Office Action dated Nov. 21, 2019, in connection with corresponding Chinese Application No. 201810162494.1 (12 pp., including machine-generated English translation).

Office Action dated Mar. 16, 2020, in connection with corresponding Chinese Application No. 201810162494.1; (17 pp., including machine-generated English translation).

Office Action dated Apr. 29, 2021, in connection with corresponding Chinese Application No. 201810162494.1; (23 pp., including machine-generated English translation).

Office Action dated Jun. 2, 2020, in connection with corresponding Chinese Application No. 201810162494.1; (12 pp., including machine-generated English translation).

Office Action dated Jan. 6, 2021, in connection with corresponding Chinese Application No. 201810162494.1 (11 pp., including machine-generated English translation).

Kelong et al., "Principles and Key Technologies of Lithium Ion Batteries"; Chemical Industry Press, Nov. 2009; (8 pages with Partial English Translation).

Shuilin et al., "Superfine Grinding Principle, Process Equipment and Application"; China Building Materials Industry Press, May 1993 (18 pages with Partial English translation).

Office Action dated Nov. 1, 2019, in connection with related U.S. Appl. No. 16/000,597; 8 Pages.

Office Action dated Oct. 22, 2021, in connection with related U.S. Appl. No. 16/868,966; 15 pages.

First Office Action dated Jan. 12, 2022, in corresponding to Chinese Application No. 202110531289.X; 5 14 pages (including machine-generated English Translation).

\* cited by examiner

ELECTRODE ELECTROCHEMICAL DEVICE AND ELECTRONIC DEVICE

CROSS-REFERENCE TO RELATED APPLICATIONS

This is a continuation application of patent application Ser. No. 16/868,966, filed on May 7, 2020, which is a divisional application of U.S. patent application Ser. No. 16/000,597, filed on Jun. 5, 2018, issue as U.S. Pat. No. 10,693,181, assigned to the same assignee, which is based on and claims priority to China Patent Application No. 201810162494.1 filed on Feb. 26, 2018, the contents of which are incorporated by reference herein.

TECHNICAL FIELD

The present application relates to battery, and more particularly to an electrode, an electrochemical device, and an electronic device.

BACKGROUND

Lithium-ion batteries have entered the daily life with the advancement of science and technology and the improvement of environmental protection requirements. With the rapid popularization of lithium-ion batteries, safety problems caused by external forces puncturing lithium-ion batteries occasionally occur on the user's side, and their safety performance has been increasingly received attention by people, especially the continued fermentation of some cell phone explosions, causing users, sales backends, and lithium-ion battery manufacturers all place new demands on the safety performance of lithium-ion batteries.

Current methods for improving the safety of lithium-ion batteries are at the expense of the energy density of lithium-ion batteries. Therefore, there is an urgent need to provide a technology that can significantly improve the safety performance of lithium-ion batteries under conditions of higher energy density.

SUMMARY

In the examples of the present application, a double layer design used for the active material layer in the electrode can avoid the internal short circuit of the lithium-ion battery caused by the external force and will not cause the battery to fail.

Some examples of the present application provide an electrode comprising: a current collector; a first active material layer, comprising a first active material; and a second active material layer, comprising a second active material; wherein the first active material layer is arranged between the current collector and the second active material layer, the first active material layer is formed on at least one surface of the current collector, and a ratio of an average particle size of the second active material to an average particle size of the first active material is from 1:1 to 40:1.

In above electrode, the first active material has an average particle size in a range of 0.2 µm to 15 µm. The average particle size (Dv50) refers to a particle size that reaches a volume accumulation of 50% from the small particle size side in a volume-based granularity distribution.

In above electrode, a particle size of 90% accumulative volume of the first active material is less than 40 µm. A particle size of 90% accumulative volume (Dv90) refers to a particle size that reaches a volume accumulation of 90% from the small particle size side in a volume-based granularity distribution.

In above electrode, the first active material layer has a thickness in a range of 2 µm to 30 µm.

In above electrode, the second active material layer has a thickness equal to or more than 30 µm.

In above electrode, the first active material comprises one of lithium cobaltate, lithium manganate, lithium nickelate, lithium nickel cobalt manganese oxide, lithium iron phosphate, lithium iron manganese phosphate, lithium vanadium phosphate, lithium vanadyl phosphate, lithium-rich manganese-based materials, lithium nickel cobalt aluminate and lithium titanate, and combinations thereof.

In above electrode, the second active material comprises one of lithium cobaltate, lithium nickel cobalt manganese oxide, lithium nickel cobalt aluminum oxide, lithium-rich manganese-based material, lithium iron phosphate, and combinations thereof.

In above electrode, the first active material comprises one of artificial graphite, natural graphite, mesocarbon microbeads, soft carbon, hard carbon, silicon, silicon carbide, lithium titanate, and combinations thereof.

In above electrode, each of the first active material layer and the second active material layer further comprises a binder, and the binder comprises one selected from polyvinylidene fluoride, vinylidene fluoride-hexafluoropropylene copolymer, polyamide, polyacrylonitrile, polyacrylates, polyacrylic acids, polyacrylic acid salt, carboxymethylcellulose sodium, polyethylene pyrrolidone, polyvinyl ether, polymethyl methacrylate, polytetrafluoroethylene, polyhexafluoropropylene and styrene butadiene rubber, and combinations thereof.

Some examples of the present application further provide a lithium-ion battery comprising above electrode s.

The double-layered active material layer is used for the active material layer in the electrode of the present application to ensure that the lithium-ion battery does not generate a short circuit when pressed by an external force, thereby ensuring the mechanical safety performance of the lithium-ion battery.

DETAILED DESCRIPTION

Figure 1:
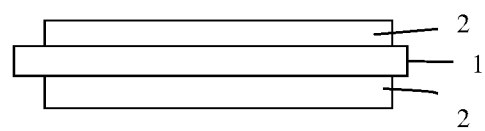
FIG. 1 shows a schematic view of the structure of a positive electrode.

The following examples may enable those skilled in the art to more fully understand the present application, but do not limit the present application in any way.

The double-layered active material layer is used for the active material layer in the electrode in the examples of the present application to ensure that the lithium-ion battery does not generate a short circuit when pressed by an external force (the corresponding test method being a nail test), thereby ensuring the mechanical safety performance of the lithium-ion battery (50% pass the nail test). The technical means of the present application can be applied to a lithium-ion battery and play a great safety role in a lithium-ion battery application terminal. It should be noted that the present application takes the positive electrode as an example, and the negative electrode can also realize the technical solution.

In the process of nail penetration for lithium-ion battery, four short circuits usually occur: positive electrode active material layer-negative electrode active material layer, positive electrode active material layer-negative electrode current collector (usually copper foil), positive electrode current collector (usually aluminum foil)-negative electrode current collector, positive electrode current collector-negative electrode active material layer. In these four short-circuit modes, the short circuit mode of the positive electrode current collector-negative electrode active material layer is the most dangerous among the four short circuit modes because the short circuit power at the time of a short circuit is very large. Therefore, preferentially avoiding such a short circuit mode of the positive electrode current collector-negative electrode active material layer is the most direct means for improving the safety of the lithium-ion battery penetrating through nails.

In the present application, the short circuit of the positive current collector-negative electrode active material layer is avoided. That is to say, a coating with a higher resistivity is provided on the surface of the negative electrode active material layer, or a coating with a higher resistivity is provided on the surface of the positive electrode current collector to avoid direct contact between the negative electrode active material layer and the positive electrode current collector so as to prevent the most dangerous short circuit mode from occurring. The coating provided on the surface of the negative electrode active material layer or the surface of the separator is usually a ceramic layer. By increasing the thickness of the ceramic layer, a short circuit between the negative electrode active material layer and the positive electrode current collector can be avoided. In order to avoid this short-circuit pattern between the negative electrode active material layer and the positive electrode current collector, the thickness of these coatings should not be too thin (generally at least greater than the surface roughness of the negative electrode active material layer surface), which will bring about the loss of energy density of the lithium-ion battery. In addition, these coatings increase the transmission distance of lithium ions from the positive electrode to the negative electrode, increase the transmission impedance of the lithium-ion battery, and greatly deteriorate the dynamic performance of the lithium-ion battery. And due to the large damage to the lithium-ion battery during the nail process, part of the coating will fall off during the nail process, thus affecting the stability of the nail protection effect.

One technical means is to allow the surface of the positive electrode current collector to adhere to a material with a higher resistivity to avoid direct contact between the positive electrode current collector and the negative electrode active material layer during the nail process. It is a common practice to reduce the particle size of the positive electrode active material and increase the binder content of the positive electrode active material layer. The decrease of the particle size of the positive electrode active material will reduce the cycle performance of the lithium-ion battery, and increasing the binder content in the positive electrode active material layer will make the positive electrode become brittle, resulting in a greater effects on the production process and the energy density of the lithium-ion battery.

Figure 2:
FIG. 2 shows a schematic view of the structure of a positive electrode according to some examples of the present application.

As shown in FIG. 1, a schematic view of a positive electrode is shown. The positive electrode current collector 1 is located between two active material layers 2. FIG. 2 shows a double-layered active material layer structure of the present application, i.e., an additional active material layer 3 is formed between the active material layer 2 and the positive electrode collector 1. The material and formulation of the active material layer 3 are optimized so that the adhesive force between the active material layer 3 and the positive electrode current collector 1 is increased, thereby protecting the positive electrode current collector 1, and the active material layer 3 will not come off during the nail process. Also, the short-circuit mode of the positive electrode current collector-negative electrode active material layer does not occur during the nail process, thereby ensuring the safety performance of the lithium-ion battery. For better differentiation, the active material layer 3 is hereinafter referred to as a first active material layer, and the active material layer 2 is referred to as a second active material layer. This is merely for better description and does not limit the present application.

The second active material layer 2 and the first active material layer 3 of the present application each contain a positive active material when compared with coating a non-conductive or poorly-conductive material layer between the positive electrode current collector and the active material layer, so that both the first and second active material layers can provide energy, and their energy density is high. The design of the present application has no effect on the conductive properties of the active material layer, while using a non-conductive or poorly conductive coating for lithium-ion batteries may exert greater influence on the electronic conductance capability of lithium-ion batteries, so that the normal charge and discharge of the lithium-ion battery will be affected.

The positive electrode active material of the first active material layer in the examples of the present application comprises one of lithium cobaltate, lithium manganate, lithium nickelate, lithium nickel cobalt manganese oxide, lithium iron phosphate, lithium iron manganese phosphate, lithium vanadium phosphate, lithium vanadyl phosphate, lithium-rich manganese-based materials, lithium nickel cobalt aluminate and lithium titanate, and combinations thereof. The positive electrode active material of the second active material layer comprises the combination of one or more selected from the group consisting of lithium cobaltate, lithium nickel cobalt manganese oxide, lithium nickel cobalt aluminum oxide, lithium-rich manganese-based material, lithium iron phosphate. The positive electrode active material layer is a two-layer structure, and there are two positive electrode active material layers on the surface of the positive electrode current collector. Although the positive electrode active material of the two active material layers shown in FIG. 2 has a clear interface, the interfaces of the two active material layers are bonded to each other without obvious interface by the embedding of the upper and lower layer particles and the binder between the two active material layers.

The active material layer of the double-layer structure protects the positive electrode current collector and the first active material layer plays a leading role. In order to achieve the protection of the positive electrode current collector, the positive electrode active material of the first active material layer is required to have a small particle size so as to achieve higher coverage and adhesion on the positive electrode current collector (aluminum foil). In order to ensure the covering and bonding of the positive electrode current collector while reducing the influence of the first active material layer on the whole active material layer (the first active material layer has a lower compaction density than the second active material layer, so it is necessary to reduce the volume proportion of the first active material layer in the whole active material layer as much as possible). In the granularity distribution of the positive electrode active material of the first active material layer on a volume basis, a particle size that reaches volume accumulation of 50% from a small particle size (Dv50) ranges from 0.2 μm to 15 μm. And in the granularity distribution of the positive electrode active material of the first active material layer on a volume basis, a particle size that reaches volume accumulation of 90% from a small particle size (Dv90) ranges below 40 μm. In order to ensure the protective effect on the positive electrode current collector, the first active material layer needs to completely cover the positive electrode current collector. The smaller the particles of the positive electrode active material, the thinner the coating can be made while the compaction density of the positive electrode active material of small particles will be lower, leading a certain impact on the energy density of the lithium-ion battery.

In addition, considering that the first active material layer and the second active material layer also have some interactions, comprising the effects of adhesion and electron conduction, and considering that the first active material layer cannot be crushed due to the force transfer of the second active material layer particles during the cold pressing, so the particle size ratio of the second active material layer and the first active material layer is another important factor that affects the performance of the lithium-ion battery.

In order to prevent the first active material layer from being damaged by the positive active material in the second active material layer during the cold pressing and to ensure the maximum adhesion between the first active material layer and the second active material layer, the ratio of Dv50 between the positive electrode active materials of the first active material layer and the second active material layer is in a certain range, i.e., Dv50 (of the second active material layer):Dv50 (of the first active material layer)=1:1 to 40:1. The particles of the positive active material of the second active material layer are too large, and thus the destructive effect on the first active material layer after the cold press increases, thereby resulting in the weakening of the protective effect of the first active material layer on the positive electrode current collector. In addition to the binding effect of the binder between the first active material layer and the second active material layer, the mutual riveting action of the positive electrode active material particles can also provide a certain binding effect. This bonding effect requires that the particle size difference between the particles is not too large. When the particles of the second active material layer are too large, this riveting effect is weakened, so that the interface between the layers becomes distinct or even separate.

In addition, the first active material layer needs a certain thickness in order to achieve full coverage of the positive electrode current collector. In order to achieve this goal, the particle size of the active material of the first active material layer has an upper limit. Since the particle size of the positive electrode active material in the first active material layer is small and the binder contained in the first active material layer is larger than the binder in the second active material layer, the thickness of the first active material layer cannot be too large, otherwise it will reduce the energy density of lithium-ion batteries. Also, since the first active material layer needs to cover the positive electrode current collector, the thickness of the first active material layer needs to be controlled to 3 μm-40 μm, and the thickness after cold pressing is 2 μm-30 μm. In particular, the thickness of the first active material layer is not less than Dv90 of the positive electrode active material in the first active material layer, which is to ensure the coverage of the first active material layer, thereby achieving complete protection of the positive electrode current collector. Since the positive electrode active material of the first active material layer has a small particle size, the compaction density thereof will be relatively low. Therefore, in order to achieve a high energy density of the lithium-ion battery, the thickness of the second active material layer needs to be increased, and the thickness of the second active material layer is increased, e.g., to 30 μm or more. The thicker the second active material layer, the higher the energy density of the lithium-ion battery.

The positive electrode is cold-pressed under a certain pressure, and the active material layer is pressed into an electrode having a certain thickness. Since the active material layer of the present application has a double-layer structure, the compaction density of the positive electrode can be divided into the compaction density of the second active material layer, the compaction density of the first active material layer, and the overall compaction density. To ensure the energy density of a lithium-ion battery, it is required that the positive electrode has a higher compaction density, the compaction density of the first active material layer is greater than 2.8 g/cc, the compaction density of the second active material layer is greater than 3.3 g/cc and the compaction density of the all active material layers is greater than 3.2 g/cc.

In addition, in order to achieve higher bonding for the first active material layer, it is required that the first active material layer contains a certain amount of binder, and the binder comprises, but is not limited to, one polyvinylidene fluoride, vinylidene fluoride-hexafluoropropylene copolymer, polyamide, polyacrylonitrile, polyacrylates, polyacrylic acids, polyacrylates, carboxymethylcellulose sodium, polyethylene pyrrolidone, polyvinyl ether, polymethyl methacrylate, polytetrafluoroethylene, polyhexafluoropropylene and styrene butadiene rubber, and combinations thereof. On the one hand, the binder allows the active material layer and the positive electrode current collector to have a better adhesion, on the other hand, when the binder content increases, the first active material layer will have a lower compaction density. The mass content of the binder in the first active material layer is selected in the range of 1.5% to 6%, and the mass content of the binder in the second active material layer is selected in the range of 0.5% to 4%.

Since the positive electrode active material in the positive electrodegenerally has a relatively common conductivity, the active material layer also contains a certain amount of a conductive agent, such as carbon black (SP), carbon nanotubes (CNT), graphene, and the like. The conductive agent increases its electrical conductivity, and the mass content of the conductive agent is selected in the range from 0.5% to 5%.

In addition, some other treatments may be performed on the first active material layer or the second active material layer, or some treatments may be performed on the positive electrode current collector, such as a roughness treatment, a heat treatment, etc. The working principle or effect comprises enhancing the adhesion of the current collector. Although such principle or effect is not described in detail in this application, it is comprised in the scope of the present application.

The examples of the present application further provide a lithium-ion battery comprising above positive electrode. The lithium-ion battery comprises a positive electrode, a negative electrode, an separator, an electrolyte, and the like. The negative electrode comprises a negative electrode current collector and a negative electrode active material layer coated on the negative electrode current collector, and the negative electrode active material layer comprises a negative electrode active material, a conductive agent and a binder. The negative electrode current collector may be a Cu foil, however, other negative electrode current collectors commonly used in the art may be used. The conductive agent and the binder of the negative electrode active material layer are similar to the conductive agent and the binder of the positive electrode active material layer described above, and will not be described herein. The negative electrode active material comprises, but is not limited to, one of soft carbon, hard carbon, mesocarbon microbeads (MCMB), silicon, silicon-carbon composites, lithium titanate, alloys, artificial graphite, and natural graphite, and combinations thereof. Above negative electrode active material comprises a negative electrode active material that has been doped and/or coated in the prior art.

The separator comprises a polyethylene (PE) separator, a polypropylene (PP) separator, and the like. In addition, the separator comprises one of a bare separation film, an inorganic particle-coated separation film, a polymer-coated separator, or a combination thereof, depending on whether or not the surface of the separator comprises a coating and on the type of the coating. The electrolyte comprises at least two of dimethyl carbonate (DMC), ethyl methyl carbonate (EMC), diethyl carbonate (DEC), ethylene carbonate (EC), propylene carbonate (PC), propyl propionate (PP). Further, the electrolyte may additionally comprise at least one of vinylene carbonate (VC), fluoroethylene carbonate (FEC), and dinitrile compounds as an electrolyte additive, wherein the dinitrile compound comprises succinonitrile (SN).

The positive electrode, the separator, and the negative electrode are sequentially wound or stacked into a bare cell, and then filled into, for example, an aluminum plastic film, and then the electrolyte is injected, followed by chemical conversion and package. Then, the prepared lithium-ion battery is subjected to performance test and cycle test.

It will be understood by those skilled in the art that above-described method for producing a lithium-ion battery is only an example. Other methods commonly used in the art can be used without departing from the disclosure of the present application.

The electrode of the present application can be used in lithium-ion batteries of different structures. In the examples, a wound lithium-ion battery is taken as an example, but the positive electrode of the present application can be applied to lithium ions of laminated structures, multi-electrode tab structures, and the like, all of which are comprised in the scope of the present application.

The electrode of the present application may be other types of electrode. In the examples, a positive electrode is taken as an example, but the electrode of the present application may be a negative electrode, all of which are comprised in the scope of the present application.

The electrode of the present application can be used in lithium-ion batteries of different types. In the examples, a soft package lithium-ion battery is taken as an example, but the electrode of the present application can be applied to other lithium-ion batteries such as square aluminum shell batteries, cylindrical batteries, and the like, all of which are comprised in the scope of the present application.

Some specific examples and comparative examples are listed below to better illustrate this application.

Comparative Example 1

An aluminum foil is used as the positive electrode collector, and a layer of lithium cobaltate slurry composed of 97.8 wt % $LiCoO_2$(LCO), 0.8 wt % polyvinylidene fluoride (PVDF) and 1.4 wt % conductive carbon black is evenly coated on the surface of aluminum foil. Then drying was performed at 85° C., followed by cold pressing, cutting, slitting, and drying under a vacuum condition of 85° C. for 4 h to prepare a positive electrode, wherein the thickness of the coating is 63 μm.

A copper foil is used as a negative electrode collector, and a layer of graphite slurry composed of 97.7 wt % artificial graphite, 1.3 wt % carboxymethyl cellulose sodium (CMC) and 1.0 wt % styrene butadiene rubber (SBR) is evenly coated on the surface of copper foil. Then drying was performed at 85° C., followed by cold pressing, cutting, slitting, and drying under a vacuum condition of 85° C. for 4 h to prepare a negative electrode.

The positive electrode and the negative electrode are wound after being slit, and the positive electrode and the negative electrode are separated by a polyethylene separator to prepare a wound bare cell. After the bare cell is top-side sealed, spray-coded, vacuum-dried, filled with electrolyte, and allowed to stand at high temperatures for chemical conversion and capacity, a finished lithium-ion battery can be obtained.

Example 1

An aluminum foil is used as the positive electrode collector, and a layer of small particle lithium nickel cobalt manganese oxide slurry composed of 95.8 wt % lithium nickel cobalt manganese oxide, 2.8 wt % polyvinylidene fluoride (PVDF) and 1.4 wt % conductive carbon black is evenly coated on the surface of aluminum foil for drying under 85° C.; a layer of lithium cobalt oxide slurry composed of 97.8 wt % $LiCoO_2$(LCO), 0.8 wt % polyvinylidene fluoride (PVDF) and 1.4 wt % conductive carbon black is evenly coated as a second active material layer on the first active material layer coated with the lithium nickel cobalt manganese oxide slurry; then drying was performed at 85° C., followed by cold pressing, cutting, slitting, and drying under a vacuum condition of 85° C. for 4 h to prepare a positive electrode. Wherein, Dv50 of the first active material (lithium nickel cobalt manganese oxide) of the first active material layer is 0.2 μm, and Dv90 of the first active material (lithium nickel cobalt manganese oxide) of the first active material layer is 20 μm. The thickness of the first active material layer is 25 μm, the ratio of Dv50 between the second active material to the first active material is 2:1, and the thickness of the second active material layer is 54 μm.

A copper foil is used as a negative electrode collector, and a layer of graphite slurry composed of 97.7 wt % artificial graphite, 1.3 wt % carboxymethyl cellulose sodium (CMC) and 1.0 wt % styrene butadiene rubber (SBR) is evenly coated on the surface of copper foil. Then drying was performed at 85° C., followed by cold pressing, cutting, slitting, and drying under a vacuum condition of 85° C. for 4 h to prepare a negative electrode.

The positive electrode and the negative electrode are wound after being slit, and the positive electrode and the negative electrode are separated by a polyethylene separator to prepare a wound bare cell. After the bare cell is top-side sealed, spray-coded, vacuum-dried, filled with electrolyte, and allowed to stand at high temperatures for chemical conversion and capacity, a finished lithium-ion battery can be obtained.

Example 2

It is the same as the preparation method of Example 1, except that Dv50 of the first active material layer in Example 2 is 0.5 μm.

Example 3

It is the same as the preparation method of Example 1, except that Dv50 of the first active material layer in Example 3 is 1 μm.

Example 4

It is the same as the preparation method of Example 1, except that Dv50 of the first active material layer in Example 4 is 3 μm.

Example 5

It is the same as the preparation method of Example 1, except that Dv50 of the first active material layer in Example 5 is 5 μm.

Example 6

It is the same as the preparation method of Example 1, except that Dv50 of the first active material layer in Example 6 is 7 μm.

Example 7

It is the same as the preparation method of Example 1, except that Dv50 of the first active material layer in Example 7 is 9 μm.

Example 8

It is the same as the preparation method of Example 1, except that Dv50 of the first active material layer in Example 8 is 11 μm.

Example 9

It is the same as the preparation method of Example 1, except that Dv50 of the first active material layer in Example 9 is 15 μm.

Example 10

It is the same as the preparation method of Example 1, except that Dv50 of the first active material layer in Example 10 is 16 μm.

Example 11

It is the same as the preparation method of Example 1, except that Dv50 of the first active material layer in Example 11 is 7 μm and Dv90 of the first active material layer is 8 μm.

Example 12

It is the same as the preparation method of Example 1, except that Dv50 of the first active material layer in Example 12 is 7 μm and Dv90 of the first active material layer is 10 μm.

Example 13

It is the same as the preparation method of Example 1, except that Dv50 of the first active material layer in Example 13 is 7 μm and Dv90 of the first active material layer is 15 μm.

Example 14

It is the same as the preparation method of Example 1, except that Dv50 of the first active material layer in Example 14 is 7 μm and Dv90 of the first active material layer is 25 μm.

Example 15

It is the same as the preparation method of Example 1, except that Dv50 of the first active material layer in Example 15 is 7 μm and Dv90 of the first active material layer is 40 μm.

Example 16

It is the same as the preparation method of Example 1, except that Dv50 of the first active material layer in Example 16 is 1 μm and Dv90 of the first active material layer is 2 μm.

Example 17

It is the same as the preparation method of Example 1, except that Dv50 of the first active material layer in Example 17 is 1 μm and Dv90 of the first active material layer is 5 μm.

Example 18

It is the same as the preparation method of Example 1, except that Dv50 of the first active material layer in Example 18 is 1 μm and Dv90 of the first active material layer is 10 μm.

Example 19

It is the same as the preparation method of Example 1, except that Dv50 of the first active material layer in Example 19 is 1 μm and Dv90 of the first active material layer is 15 μm.

Example 20

It is the same as the preparation method of Example 1, except that Dv50 of the first active material layer in Example 20 is 1 μm and Dv90 of the first active material layer is 20 μm.

Example 21

It is the same as the preparation method of Example 1, except that Dv50 of the first active material layer in Example 21 is 7 μm and Dv90 of the first active material layer is 45 μm.

Example 22

It is the same as the preparation method of Example 1, except that Dv50 of the first active material layer in Example 22 is 7 μm and the ratio of Dv50 between the second active material layer to the first active material layer is 1:1.

Example 23

It is the same as the preparation method of Example 1, except that Dv50 of the first active material layer in Example 23 is 7 μm and the ratio of Dv50 between the second active material layer to the first active material layer is 5:1.

Example 24

It is the same as the preparation method of Example 1, except that Dv50 of the first active material layer in Example 24 is 1 μm and the ratio of Dv50 between the second active material layer to the first active material layer is 1:1.

Example 25

It is the same as the preparation method of Example 1, except that Dv50 of the first active material layer in Example 25 is 1 μm and the ratio of Dv50 between the second active material layer to the first active material layer is 2:1.

Example 26

It is the same as the preparation method of Example 1, except that Dv50 of the first active material layer in Example 26 is 1 μm and the ratio of Dv50 between the second active material layer to the first active material layer is 5:1.

Example 27

It is the same as the preparation method of Example 1, except that Dv50 of the first active material layer in Example 27 is 1 μm and the ratio of Dv50 between the second active material layer to the first active material layer is 10:1.

Example 28

It is the same as the preparation method of Example 1, except that Dv50 of the first active material layer in Example 28 is 1 μm and the ratio of Dv50 between the second active material layer to the first active material layer is 20:1.

Example 29

It is the same as the preparation method of Example 1, except that Dv50 of the first active material layer in Example 29 is 1 μm and the ratio of Dv50 between the second active material layer to the first active material layer is 40:1.

Example 30

It is the same as the preparation method of Example 1, except that Dv50 of the first active material layer in Example 30 is 1 μm and the ratio of Dv50 between the second active material layer to the first active material layer is 45:1.

Example 31

It is the same as the preparation method of Example 1, except that Dv50 of the first active material layer in Example 31 is 1 μm and the thickness of the first active material layer is 2 μm.

Example 32

It is the same as the preparation method of Example 1, except that Dv50 of the first active material layer in Example 32 is 1 μm and the thickness of the first active material layer is 5 μm.

Example 33

It is the same as the preparation method of Example 1, except that Dv50 of the first active material layer in Example 33 is 1 μm and the thickness of the first active material layer is 7 μm.

Example 34

It is the same as the preparation method of Example 1, except that Dv50 of the first active material layer in Example 34 is 1 μm and the thickness of the first active material layer is 10 μm.

Example 35

It is the same as the preparation method of Example 1, except that Dv50 of the first active material layer in Example 35 is 1 μm and the thickness of the first active material layer is 15 μm.

Example 36

It is the same as the preparation method of Example 1, except that Dv50 of the first active material layer in Example 36 is 1 μm and the thickness of the first active material layer is 20 μm.

Example 37

It is the same as the preparation method of Example 1, except that Dv50 of the first active material layer in Example 37 is 1 μm and the thickness of the first active material layer is 30 μm.

Example 38

It is the same as the preparation method of Example 1, except that Dv50 of the first active material layer in Example 38 is 7 μm and the thickness of the second active material layer is 30 μm.

Example 39

It is the same as the preparation method of Example 1, except that Dv50 of the first active material layer in Example 39 is 7 μm and the thickness of the second active material layer is 40 μm.

Example 40

It is the same as the preparation method of Example 1, except that Dv50 of the first active material layer in Example 40 is 7 μm and the thickness of the second active material layer is 50 μm.

Example 41

It is the same as the preparation method of Example 1, except that Dv50 of the first active material layer in Example 41 is 7 μm and the thickness of the second active material layer is 60 μm.

Example 42

It is the same as the preparation method of Example 1, except that Dv50 of the first active material layer in Example 42 is 7 μm and the thickness of the second active material layer is 70 μm.

Example 43

It is the same as the preparation method of Example 1, except that Dv50 of the first active material layer in Example 43 is 7 μm and the thickness of the second active material layer is 80 μm.

Example 44

It is the same as the preparation method of Example 1, except that Dv50 of the first active material layer in Example 44 is 7 μm and the thickness of the second active material layer is 100 μm.

Example 45

It is the same as the preparation method of Example 1, except that Dv50 of the first active material layer in Example 45 is 7 μm.

Example 46

It is the same as the preparation method of Example 1, except that the positive electrode active material of the first active material layer in Example 46 is lithium cobaltate and Dv50 of the first active material layer is 7 μm.

Example 47

It is the same as the preparation method of Example 1, except that the positive electrode active material of the first active material layer in Example 47 is lithium manganese oxide and Dv50 of the first active material layer is 7 μm.

Example 48

It is the same as the preparation method of Example 1, except that the positive electrode active material of the first active material layer in Example 48 is lithium iron phosphate and Dv50 of the first active material layer is 7 μm.

Example 49

It is the same as the preparation method of Example 1, except that the positive electrode active material of the first active material layer in Example 49 is lithium nickel cobalt aluminate and Dv50 of the first active material layer is 7 μm.

Example 50

It is the same as the preparation method of Example 1, except that the positive electrode active material of the first active material layer in Example 50 is lithium titanate and Dv50 of the first active material layer is 7 μm.

Next, the passing rate of nail penetration and energy density of lithium-ion batteries are tested.

1. Method for Nail Test:

Place the lithium-ion battery in a 25° C. thermostat and allow it to stand for 30 minutes to allow the lithium-ion battery to reach a constant temperature. The thermostated lithium-ion battery is charged at a constant current of 0.5 C to a voltage of 4.4 V, and then charged at a constant voltage of 4.4 V to a current of 0.025 C. The fully-charged lithium-ion battery is transferred to a nailing tester and the test ambient temperature is maintained at 25° C.±2° C., and then a steel nail with a 4 mm diameter is used to penetrate through the center of the lithium-ion battery at a uniform speed of 30 mm/s and keep the steel nail for 300 s. If the lithium-ion battery does not fire and explode, it is marked as PASS. Ten lithium-ion batteries are tested each time, and the number of lithium-ion batteries passed the nail test is used as an indicator to evaluate the safety performance of the lithium-ion battery.

2. Method for Testing Energy Density:

Place the lithium-ion battery in a 25° C. thermostat and allow it to stand for 30 minutes to allow the lithium-ion battery to reach a constant temperature. The thermostated lithium-ion battery is charged at a constant current of 0.5 C to a voltage of 4.4 V, and then charged at a constant voltage of 4.4 V to a current of 0.05 C, discharged at 0.5 C to a voltage of 3.0 V, and the discharge energy is recorded.

Energy density=discharge energy/
(length*width*thickness of lithium-ion battery).

Experimental parameters and measurement results of the respective examples and comparative examples are shown in Table 1 below.

TABLE 1

| Examples | The first active material | Dv50/μm (the first active material) | Dv90/μm (the first active material) | Dv50 ratio (the second active mateial:the first active material) | Thickness of the first active material (/μm) | Thickness of the second active material/ μm | Mass content of binder of the first active material (wt %) | Mass content of binder of the second active material (wt %) | nail penetration PASS rate | Energy density (Wh/L) |
| --- | --- | --- | --- | --- | --- | --- | --- | --- | --- | --- |
| 1 | lithium nickel cobalt manganese oxide | 0.2 | 20 | 2:1 | 25 | 54 | 2.8 | 0.8 | 10/10 | 721 |
| 2 | lithium nickel cobalt manganese oxide | 0.5 | 20 | 2:1 | 25 | 54 | 2.8 | 0.8 | 10/10 | 721 |
| 3 | lithium nickel cobalt manganese oxide | 1 | 20 | 2:1 | 25 | 54 | 2.8 | 0.8 | 10/10 | 721 |
| 4 | lithium nickel cobalt manganese oxide | 3 | 20 | 2:1 | 25 | 54 | 2.8 | 0.8 | 10/10 | 729 |

TABLE 1-continued

| Examples | The first active material | Dv50/μm (the first active material) | Dv90/μm (the first active material) | Dv50 ratio (the second active mateial:the first active material) | Thickness of the first active material (/μm) | Thickness of the second active material/ μm | Mass content of binder of the first active material (wt %) | Mass content of binder of the second active material (wt %) | nail penetration PASS rate | Energy density (Wh/L) |
|---|---|---|---|---|---|---|---|---|---|---|
| 5 | lithium nickel cobalt manganese oxide | 5 | 20 | 2:1 | 25 | 54 | 2.8 | 0.8 | 10/10 | 735 |
| 6 | lithium nickel cobalt manganese oxide | 7 | 20 | 2:1 | 25 | 54 | 2.8 | 0.8 | 10/10 | 738 |
| 7 | lithium nickel cobalt manganese oxide | 9 | 20 | 2:1 | 25 | 54 | 2.8 | 0.8 | 10/10 | 741 |
| 8 | lithium nickel cobalt manganese oxide | 11 | 20 | 2:1 | 25 | 54 | 2.8 | 0.8 | 8/10 | 745 |
| 9 | lithium nickel cobalt manganese oxide | 15 | 20 | 2:1 | 25 | 54 | 2.8 | 0.8 | 6/10 | 750 |
| 10 | lithium nickel cobalt manganese oxide | 16 | 20 | 2:1 | 25 | 54 | 2.8 | 0.8 | 5/10 | 752 |
| 11 | lithium nickel cobalt manganese oxide | 7 | 8 | 2:1 | 25 | 54 | 2.8 | 0.8 | 10/10 | 738 |
| 12 | lithium nickel cobalt manganese oxide | 7 | 10 | 2:1 | 25 | 54 | 2.8 | 0.8 | 10/10 | 738 |
| 13 | lithium nickel cobalt manganese oxide | 7 | 15 | 2:1 | 25 | 54 | 2.8 | 0.8 | 10/10 | 738 |
| 6 | lithium nickel cobalt manganese oxide | 7 | 20 | 2:1 | 25 | 54 | 2.8 | 0.8 | 10/10 | 738 |
| 14 | lithium nickel cobalt manganese oxide | 7 | 25 | 2:1 | 25 | 54 | 2.8 | 0.8 | 9/10 | 738 |
| 15 | lithium nickel cobalt manganese oxide | 7 | 40 | 2:1 | 25 | 54 | 2.8 | 0.8 | 9/10 | 738 |
| 16 | lithium nickel cobalt manganese oxide | 1 | 2 | 2:1 | 25 | 54 | 2.8 | 0.8 | 10/10 | 721 |
| 17 | lithium nickel cobalt manganese oxide | 1 | 5 | 2:1 | 25 | 54 | 2.8 | 0.8 | 10/10 | 721 |
| 18 | lithium nickel cobalt manganese oxide | 1 | 10 | 2:1 | 25 | 54 | 2.8 | 0.8 | 10/10 | 721 |
| 19 | lithium nickel cobalt manganese oxide | 1 | 15 | 2:1 | 25 | 54 | 2.8 | 0.8 | 10/10 | 721 |
| 20 | lithium nickel cobalt manganese oxide | 1 | 20 | 2:1 | 25 | 54 | 2.8 | 0.8 | 10/10 | 721 |
| 21 | lithium nickel cobalt manganese oxide | 7 | 45 | 2:1 | 25 | 54 | 2.8 | 0.8 | 3/10 | 737 |
| 22 | lithium nickel cobalt manganese oxide | 7 | 20 | 1:1 | 25 | 54 | 2.8 | 0.8 | 10/10 | 741 |
| 6 | lithium nickel cobalt manganese oxide | 7 | 20 | 2:1 | 25 | 54 | 2.8 | 0.8 | 10/10 | 738 |
| 23 | lithium nickel cobalt manganese oxide | 7 | 20 | 5:1 | 25 | 54 | 2.8 | 0.8 | 9/10 | 725 |
| 24 | lithium nickel cobalt manganese oxide | 1 | 20 | 1:1 | 25 | 54 | 2.8 | 0.8 | 10/10 | 721 |
| 25 | lithium nickel cobalt manganese oxide | 1 | 20 | 2:1 | 25 | 54 | 2.8 | 0.8 | 10/10 | 721 |
| 26 | lithium nickel cobalt manganese oxide | 1 | 20 | 5:1 | 25 | 54 | 2.8 | 0.8 | 10/10 | 721 |
| 27 | lithium nickel cobalt manganese oxide | 1 | 20 | 10:1 | 25 | 54 | 2.8 | 0.8 | 10/10 | 717 |
| 28 | lithium nickel cobalt manganese oxide | 1 | 20 | 20:1 | 25 | 54 | 2.8 | 0.8 | 9/10 | 713 |
| 29 | lithium nickel cobalt manganese oxide | 1 | 20 | 40:1 | 25 | 54 | 2.8 | 0.8 | 7/10 | 709 |
| 30 | lithium nickel cobalt manganese oxide | 1 | 20 | 45:1 | 25 | 54 | 2.8 | 0.8 | 2/10 | 697 |
| 31 | lithium nickel cobalt manganese oxide | 1 | 20 | 2:1 | 2 | 54 | 2.8 | 0.8 | 10/10 | 721 |
| 32 | lithium nickel cobalt manganese oxide | 1 | 20 | 2:1 | 5 | 54 | 2.8 | 0.8 | 10/10 | 719 |
| 33 | lithium nickel cobalt manganese oxide | 1 | 20 | 2:1 | 7 | 54 | 2.8 | 0.8 | 10/10 | 718 |
| 34 | lithium nickel cobalt manganese oxide | 1 | 20 | 2:1 | 10 | 54 | 2.8 | 0.8 | 10/10 | 715 |
| 35 | lithium nickel cobalt manganese oxide | 1 | 20 | 2:1 | 15 | 54 | 2.8 | 0.8 | 10/10 | 711 |
| 36 | lithium nickel cobalt manganese oxide | 1 | 20 | 2:1 | 20 | 54 | 2.8 | 0.8 | 10/10 | 706 |
| 37 | lithium nickel cobalt manganese oxide | 1 | 20 | 2:1 | 30 | 54 | 2.8 | 0.8 | 10/10 | 698 |
| 38 | lithium nickel cobalt manganese oxide | 7 | 20 | 2:1 | 25 | 30 | 2.8 | 0.8 | 10/10 | 723 |

TABLE 1-continued

| Examples | The first active material | Dv50/μm (the first active material) | Dv90/μm (the first active material) | Dv50 ratio (the second active mateial:the first active material) | Thickness of the first active material (/μm) | Thickness of the second active material/ μm | Mass content of binder of the first active material (wt %) | Mass content of binder of the second active material (wt %) | nail penetration PASS rate | Energy density (Wh/L) |
|---|---|---|---|---|---|---|---|---|---|---|
| 39 | lithium nickel cobalt manganese oxide | 7 | 20 | 2:1 | 25 | 40 | 2.8 | 0.8 | 10/10 | 734 |
| 40 | lithium nickel cobalt manganese oxide | 7 | 20 | 2:1 | 25 | 50 | 2.8 | 0.8 | 10/10 | 735 |
| 6 | lithium nickel cobalt manganese oxide | 7 | 20 | 2:1 | 25 | 54 | 2.8 | 0.8 | 10/10 | 738 |
| 41 | lithium nickel cobalt manganese oxide | 7 | 20 | 2:1 | 25 | 60 | 2.8 | 0.8 | 10/10 | 743 |
| 42 | lithium nickel cobalt manganese oxide | 7 | 20 | 2:1 | 25 | 70 | 2.8 | 0.8 | 10/10 | 751 |
| 43 | lithium nickel cobalt manganese oxide | 7 | 20 | 2:1 | 25 | 80 | 2.8 | 0.8 | 10/10 | 766 |
| 44 | lithium nickel cobalt manganese oxide | 7 | 20 | 2:1 | 25 | 100 | 2.8 | 0.8 | 10/10 | 778 |
| 45 | lithium nickel cobalt manganese oxide | 7 | 20 | 2:1 | 25 | 54 | 2.8 | 0.8 | 10/10 | 738 |
| 46 | lithium cobaltate | 7 | 20 | 2:1 | 25 | 54 | 2.8 | 0.8 | 10/10 | 743 |
| 47 | lithium manganese oxide | 7 | 20 | 2:1 | 25 | 54 | 2.8 | 0.8 | 10/10 | 728 |
| 48 | lithium iron phosphate | 7 | 20 | 2:1 | 25 | 54 | 2.8 | 0.8 | 10/10 | 730 |
| 49 | lithium nickel cobalt aluminate | 7 | 20 | 2:1 | 25 | 54 | 2.8 | 0.8 | 10/10 | 735 |
| 50 | lithium titanate | 7 | 20 | 2:1 | 25 | 54 | 2.8 | 0.8 | 10/10 | 723 |
| Comparative Example | | | | | | | | | | |
| 1 | / | / | / | / | / | 79 | / | 0.8 | 0/10 | 747 |

Comparing Comparative Example 1 with Examples 1-50, it can be seen that through the use of the active material layer having a double layer structure, the nail penetration PASS rate of the lithium-ion battery has been improved with a different extent, and the energy density is not substantially affected.

From Examples 1-9, it can be seen that as the Dv50 of the first active material layer increases, the energy density also increases, but then the nail penetration PASS rate is reduced. By comparing Examples 1-10, it can be seen that when the Dv50 of the first active material layer is greater than 15 μm, the nail penetration PASS rate of the lithium-ion battery is reduced to a low level.

From Examples 11-20 and 6, it can be seen that as the Dv90 of the first active material layer increases, the energy density is almost constant, but then the nail penetration PASS rate of the lithium-ion battery is reduced. By comparing Example 6 with Examples 11-21, it can be seen that when the Dv90 of the first active material layer of the lithium-ion battery is greater than 40 μm, the nail penetration PASS rate of the lithium-ion battery is reduced to a low level.

By comparing Example 6 with Examples 22-30, it can be seen that as the ratio of the positive electrode active material Dv50 of the second active material layer and the first active material layer increases, both the energy density and the nail penetration PASS rate decrease, and the second active material decreases. When the ratio of the positive electrode active material Dv50 between the first and second active material layer exceeds 40, the nail penetration PASS rate of the lithium-ion battery is reduced to a low level.

According to Examples 31-37, it can be seen that when the thickness of the first active material layer is in a range of 2 μm to 30 μm, the nail penetration performance of the lithium-ion battery is maintained well.

By comparing Example 6 with Examples 38-44, it can be seen that as the thickness of the second active material layer increases, the nail penetration performance of the lithium-ion battery remains substantially unchanged, but the energy density increases.

From Examples 45-50, it can be seen that the positive active material of the first active material layer is selected from different materials, all of the lithium-ion batteries have excellent nail penetration performance, and the energy density varies slightly with different material.

Those skilled in the art should understand that the above examples are merely exemplary examples, and various changes, substitutions, and changes can be made without departing from the spirit and scope of the present application.

What is claimed is:

1. An electrode, comprising:
   a current collector;
   a first layer comprising a first material; and
   a second layer comprising a second material;
   wherein the first layer is arranged between the current collector and the second layer, the first layer is formed on a surface of the current collector, and a particle size of 90% accumulative volume of the first material is less than 40 μm;
   wherein a compaction density of the first layer is greater than 2.8 g/cc, and a compaction density of the second layer is greater than 3.3 g/cc.

2. The electrode according to claim 1, wherein a thickness of the first layer is not less than the particle size of 90% accumulative volume of the first material in the first layer.

3. The electrode according to claim 1, wherein a ratio of the average particle size of the second material to the average particle size of the first material is from 1:1 to 40:1.

4. The electrode according to claim 1, wherein the first material has an average particle size in a range of 0.2 μm to 15 μm.

5. The electrode according to claim 1, wherein the first layer has a lower compaction density than the second layer.

6. The electrode according to claim 1, wherein the binder contained in the first layer is larger than the binder in the second layer.

7. The electrode according to claim 1, wherein the first material comprises one selected from the group consisting of lithium cobaltate, lithium manganate, lithium nickelate, lithium nickel cobalt manganese oxide, lithium iron phosphate, lithium iron manganese phosphate, lithium vanadium phosphate, lithium vanadyl phosphate, lithium-rich manganese-based materials, lithium nickel cobalt aluminate and lithium titanate, and combinations thereof.

8. The electrode according to claim 1, wherein the second material comprises one selected from the group consisting of lithium cobaltate, lithium nickel cobalt manganese oxide, lithium nickel cobalt aluminum oxide, lithium-rich manganese-based material, lithium iron phosphate, and combinations thereof.

9. The electrode according to claim 1, wherein the first material comprises one selected from the group consisting of artificial graphite, natural graphite, mesocarbon microbeads, soft carbon, hard carbon, silicon, silicon carbide, lithium titanate, and combinations thereof.

10. An electrochemical device, comprising an electrode, wherein the electrode comprises:
a current collector;
a first layer comprising a first material; and
a second layer comprising a second material;
wherein the first layer is arranged between the current collector and the second layer, the first layer is formed on a surface of the current collector, and a particle size of 90% accumulative volume of the first material is less than 40 μm;
wherein a compaction density of the first layer is greater than 2.8 g/cc, and a compaction density of the second layer is greater than 3.3 g/cc.

11. The electrochemical device according to claim 10, wherein a thickness of the first layer is not less than the particle size of 90% accumulative volume of the first material in the first layer.

12. The electrochemical device according to claim 10, wherein a ratio of the average particle size of the second material to the average particle size of the first material is from 1:1 to 40:1.

13. The electrochemical device according to claim 10, wherein the first material has an average particle size in a range of 0.2 μm to 15 μm.

14. The electrochemical device according to claim 10, wherein the first layer has a lower compaction density than the second layer.

15. The electrochemical device according to claim 10, wherein the binder contained in the first layer is larger than the binder in the second layer.

16. The electrochemical device according to claim 10, wherein the first material comprises one selected from the group consisting of lithium cobaltate, lithium manganate, lithium nickelate, lithium nickel cobalt manganese oxide, lithium iron phosphate, lithium iron manganese phosphate, lithium vanadium phosphate, lithium vanadyl phosphate, lithium-rich manganese-based materials, lithium nickel cobalt aluminate and lithium titanate, and combinations thereof.

17. The electrochemical device according to claim 10, wherein the second material comprises one selected from the group consisting of lithium cobaltate, lithium nickel cobalt manganese oxide, lithium nickel cobalt aluminum oxide, lithium-rich manganese-based material, lithium iron phosphate, and combinations thereof.

18. The electrochemical device according to claim 10, wherein the first material comprises one selected from the group consisting of artificial graphite, natural graphite, mesocarbon microbeads, soft carbon, hard carbon, silicon, silicon carbide, lithium titanate, and combinations thereof.

19. An electronic device, comprising an electrochemical device, the electrochemical device comprising an electrode, wherein the electrode comprises:
a current collector;
a first layer comprising a first material; and
a second layer comprising a second material;
wherein the first layer is arranged between the current collector and the second layer, the first layer is formed on a surface of the current collector, and a particle size of 90% accumulative volume of the first material is less than 40 μm;
wherein a compaction density of the first layer is greater than 2.8 g/cc, and a compaction density of the second layer is greater than 3.3 g/cc.

20. The electronic device according to claim 19, wherein the first layer has a lower compaction density than the second layer.

* * * * *